United States Patent [19]

Burgess et al.

[11] 4,093,787

[45] June 6, 1978

[54] VINYL CHLORIDE POLYMERIZATION PROCESS

[75] Inventors: Robin Henry Burgess, Hertford; Jeffrey Chester Greaves, Welwyn Garden City, both of England

[73] Assignee: Imperial Chemical Industries Limited, London, England

[21] Appl. No.: 604,896

[22] Filed: Aug. 14, 1975

Related U.S. Application Data

[63] Continuation of Ser. No. 412,030, Nov. 1, 1973, abandoned.

[30] Foreign Application Priority Data

Nov. 20, 1972 United Kingdom ............... 53490/72

[51] Int. Cl.² ............................................. C08F 2/20
[52] U.S. Cl. ...................................... 526/62; 526/202; 526/233; 526/344.2

[58] Field of Search .................... 260/92.8 W, 87.5 R; 526/62, 344, 345

[56] References Cited

U.S. PATENT DOCUMENTS

| 3,669,946 | 6/1972 | Koyanagi | 260/87.5 R |
| 3,757,001 | 9/1973 | Reiter | 260/92.8 W |
| 3,778,423 | 12/1973 | Reiter | 260/92.8 W |
| 3,825,434 | 7/1974 | Berens | 260/585.5 |

*Primary Examiner*—Christopher A. Henderson, Jr.
*Attorney, Agent, or Firm*—Cushman, Darby & Cushman

[57] ABSTRACT

Vinyl chloride is polymerized in aqueous dispersion, preferably in aqueous dispersion, preferably in aqueous suspension, in a reactor with walls coated with a layer of a cross-linked polymeric material containing polar groups formed from a reaction mixture having an aldehyde, preferably formaldehyde, as one component thereof.

7 Claims, No Drawings

VINYL CHLORIDE POLYMERIZATION PROCESS

This is a continuation, of application Ser. No. 412,030 filed Nov. 1, 1973 (now abandoned).

In copending U.S. application Ser. No. 415,124, now U.S. Pat. No. 3,915,944, there is described a process in which vinyl chloride polymers are prepared by polymerization in aqueous dispersion without or with a much reduced formation of build-up by carrying out the polymerization in the presence of unreacted polyethylene imine, the polyethylene imine being applied to the inner wall(s) of the reactor and/or to the aqueous medium in the reactor.

The present invention relates to the production of vinyl chloride polymers by an aqueous dispersion polymerisation process.

It is well known to produce vinyl chloride polymers using an aqueous dispersion polymerisation process, e.g. by polymerising vinyl chloride, or vinyl chloride and an ethylenically unsaturated monomer copolymerisable therewith, in aqueous suspension in a reactor (conveniently made of a metal such as stainless steel) using a protective colloid as a suspension agent and a free-radical-yielding substance (usually monomer soluble) as initiator. While this type of process has now been commercially developed to a high degree of sophistication, one important drawback that has remained obstinately outstanding is the formation of a layer of build-up upon the inner surface of the polymerisation reactor. This build-up necessitates inter-batch cleaning, by which we mean that the deposited build-up is removed as completely as possible (e.g. by scraping, solvent cleaning or pressure-washing) from the inner wall of the reactor after completing each polymerisation in a given reactor. If this were not done, then parts of the hard polymeric material constituting the build-up could find their way into the particles made in subsequent batches in the same reactor and deleteriously affect the properties of the resulting polymers. Even more seriously, the formation of build-up reduces the heat transfer ability of the reactor wall to the cooling fluid (usually water) circulating in a jacket surrounding the reactor (many polymerisation reactors are cooled by this type of arrangement) which necessitates an increased cooling requirement to maintain the desired polymerisation temperature. It is clearly seen that this situation could rapidly worsen with successive batches made in a given reactor if the inner surface of the reactor was not cleaned after the completion of each polymerisation batch and adequate temperature control could quickly become impossible. In fact, adequate temperature control could become questionable or even impossible in the very next polymerisation carried out in a reactor (particularly a very large reactor) which, for the first time, has not had its build-up removed.

This seemingly invariable formation of build-up which increases with polymerisation time is also a major difficulty in the development of trouble-free continuous processes for the aqueous dispersion polymerisation of vinyl chloride.

We have now discovered a process whereby vinyl chloride polymers may be prepared in aqueous dispersion without the or with a much reduced formation of build-up. This process may substantially reduce the cleaning effort required between each batch polymerisation and may even allow two or more successive batch polymerisations to be carried out in the same reactor without the necessity for inter-batch removal of build-up. The avoidance of the necessity for inter-batch cleaning in batch polymerisations is of great economic significance since it not only avoids the expense of the equipment and manpower required to carry out such cleaning but also shortens the turnround time of a given reactor leading to increased productivity.

In addition, the process of our invention could be applied with advantage to the continuous polymerisation of vinyl chloride since it may overcome the drawback of an ever-thickening skin of build-up.

According to the present invention we provide a process for the production of vinyl chloride polymers which process comprises polymerising vinyl chloride, or vinyl chloride and up to 20% by weight thereof of at least one ethylenically unsaturated monomer copolymerisable therewith, in aqueous dispersion, preferably in aqueous suspension, in a reactor with an inner wall(s) on which there has been deposited an insoluble layer of a cross-linked polymeric material containing polar groups formed from a reaction mixture having an aldehyde, preferably formaldehyde, as one component thereof.

It is to be understood that the other component or at least one of the other components (if more than one) of the reaction mixture should have more than two sites of reactivity in order to form a cross-linked polymer with the aldehyde.

By the term "insoluble" we mean that the coated layer of polymeric material should not be dissolvable by or react with the aqueous medium (whether it be acidic, neutral or alkaline) or with the organic medium used in the polymerisation.

The layer of cross-linked polymeric material may be formed by applying solutions or dispersions of the components required to form the cross-linked polymer to the autoclave wall, e.g. by spraying or flushing the wall with the solutions or dispersions. Each component may be applied to the wall as a separate solution or dispersion or may be applied in admixture with one or more of the other components. It is also possible to apply all the components required for the formation of the cross-linked polymer to the wall in the same solution or dispersion, although this is not preferred because of the danger of premature reaction before the components have been deposited on the wall.

Once the components have been deposited on the wall they react, either of their own accord or after the application of heat, to form the layer of cross-linked polymeric material.

It is preferred that the liquid for carrying the components when they are added to the wall is water, although other liquids such as organic solvents may sometimes be used.

It is thought that the cross-linked polymeric materials become anchored to the reactor wall by means of some of the polar groups and thus cannot be readily removed by the polymerisation medium. It is also thought that these polar groups or other groups in the molecule inhibit the formation of build-up without inhibiting the polymerisation in the main dispersed mass. The use of less strongly adsorbed molecules may suppress build-up formation but this may only be at the expense of retarding the overall polymerisation. Clearly such an effect is undesirable from the economic stand point. Additionally, less strongly adsorbed materials may affect the quality of the product (notably colour quality) deleteriously. Examples of polar groups include carboxyl, hydroxy, amino, imino and amido groups.

Suitable cross-linked polymeric materials include the materials obtained by condensing monomeric phenols such as phenol and para-hydroxybenzoic acid with an aldehyde and the materials obtained by cross-linking polar monomeric or polymeric materials such as melamine, diamino diphenyl ether, urea and polyethylene imine with an aldehyde. It is preferred that the aldehyde employed is formaldehyde since cross-linked products are easily obtainable with this material. It is to be understood that many of the polar groupings in such cross-linked materials may not have taken part in the cross-linking reaction.

In the case of the basic (i.e., alkaline) types of coating material it is preferred that the polymerising medium is kept at a pH of greater than 4 by the use (where necessary) of buffers or alkaline substances. Suitable alkaline substances include sodium, potassium, calcium and ammonium hydroxides, carbonates and bicarbonates, and buffers include mixtures of the disodium and monosodium hydrogen ortho phosphates ($Na_2HPO_4$ and $NaH_2PO_4$). It is of course to be understood that the pH of the reaction medium may of its own accord remain at above 4 in which case the addition of a buffer or alkaline substance may not be necessary.

In the process of our invention, the amount of cross-linked polymeric material used is preferably 1 to 2,000 parts per million (particularly 10–200 parts per million) based on the charge of the vinyl chloride (in the case of batch polymerisations).

In the preferred process of our invention, vinyl chloride is polymerised in aqueous suspension and in such a process the ingredients conventionally used in vinyl chloride aqueous suspension polymerisations which include suspension agents and free-radical yielding initiators (usually monomer soluble) should be employed.

It is also possible in the process of our invention to incorporate any suitable additive (such as a heat stabiliser) into the polymerising reactants at any stage of the polymerisation, although if it is added at or towards the beginning of polymerisation it should not inhibit the polymerisation reaction.

The present invention is illustrated by the following examples.

EXAMPLES 1-5

A series of vinyl chloride polymerisations was carried out in a stainless steel reactor the walls of which were treated either hot or cold with polyethylene imine (PEI) and formaldehyde. The basic recipe used consisted of pretreating the reactor walls as described in Table 1. Polymerisation was then carried out using 100 parts of vinyl chloride (in aqueous suspension), 150 parts of water, a paddle stirrer rotating at 225 r.p.m., a polymerisation temperature of 51° C, 0.06 parts of diethylperoxydicarbonate as initiator and a suspension agent consisting of 0.11 parts of a partially hydrolysed polyvinyl acetate resin. The polymerisation was buffered to an approximately neutral pH using a mixture of $Na_2HPO_4$ (0.066 parts) and $NaH_2PO_4$ (0.033 parts). The polymerisation of each batch was continued until the pressure in the reactor had fallen by 40 p.s.i. below the steady pressure during polymerisation. In Examples 2 and 4, the reactor walls were cleaned before treatment and polymerisation. In Examples 3 and 5, however, the walls were not pretreated as such, but were used as obtained after discharging the batch corresponding to the previous example. The amount of build-up formed was estimated by removing the adherent film and weighing. Results are given in Table 1.

TABLE 1

| Example No. | Reactor Pretreatment | Weight of build-up (parts per hundred vinyl chloride charged) | Total reaction time (minutes) |
| --- | --- | --- | --- |
| 1 | None | 0.015 | 380 |
| 2 | Sprayed first with 0.0012 parts PEI and then with 0.005 parts formaldehyde (both in water) without drying in between. Heated for 10 minutes at 80° C. | None | 385 |
| 3 | No further treatment (but no cleaning after Example 2). | Trace <0.001 | 400 |
| 4 | Sprayed first with 0.003 parts PEI and then with 0.02 parts formaldehyde (both in water). Room temperature. | None | 360 |
| 5 | No further treatment (but no cleaning after Example 4). | None | 360 |

The results shown in Table 1 indicate that the use of the product of polyethylene imine and formaldehyde produces a significant build-up suppression without retardation of the polymerisation reaction.

EXAMPLE 6

138 g p-hydroxybenzoic acid were heated with 100 ml water and 100 g of 30% aqueous formaldehyde and 15 mlsconc. HCl at 98°–100° C for 2 hours. The initial white solid (p-hydroxybenzoic acid) dissolved and after about 1 hour, a white solid precipitated. After cooling to about 60° C, 40% aqueous NaOH was added continuously until all the white precipitate had dissolved and the pH of the medium was 9.6–10. This solution was divided into two equal parts, A and B.

138 g p-hydroxybenzoic acid, 100 g of 30% aqueous formaldehyde were mixed together and 40% aqueous NaOH solution added until the initial solid dissolved and the pH was 9.6–100. This solution was divided into two equal parts, C and D.

Solutions A and C were mixed and refluxed for 45 minutes. After about 30 minutes, a solid precipitated which was insoluble in ethanol. This product was discarded.

Solutions B and D were mixed and refluxed for 20 minutes. A thick red syrup formed which on acidification with dil. HCl gave a white precipitate. This was filtered off and washed with waer. It was partially dried at room temperature by sucking air through it using a vacuum pump. This product was used in Examples 7-10.

EXAMPLES 7-10

A series of vinyl chloride polymerisations was carried out to assess the effect of the p-hydroxybenzoic acid condensate described in Example 6 on build-up formation. The basic recipe used consisted of pretreating the reactor wall as described in Table 2. Polymerisation was then carried out using 100 parts of vinyl chloride (in aqueous suspension), 210 parts of water, a paddle stirrer rotating at 300 r.p.m., a polymerisation temperature of 50° C, 0.09 parts of diethylperoxydicarbonate as initiator and a suspension agent consisting of 0.2 parts of a partially hydrolysed polyvinyl acetate resin. The polymerisation of each batch was continued until the pressure in the reactor had fallen by 40 p.s.i. below the steady pressure during polymerisation. In Examples 8 and 9 the reactor walls were cleaned before treatment and polymerisation. In Examples 10 and 11, however, the walls were not pretreated as such but were used as obtained after discharging the batch corresponding to the previous example. The amount of build-up was estimated visually.

TABLE 2

| Example No. | Reactor Pretreatment | Amount of build-up | Reaction Time (minutes) |
|---|---|---|---|
| 7 | None | Skin over entire surface of reactor. | 330 |
| 8 | Vertical strip of reactor painted with 10 % ethanolic solution of condensate. Heated for 10 minutes at 100° C. | No build-up on strip. Normal build-up on remainder. | 305 |
| 9 | Vertical strip of reactor painted with 10 % ethanolic solution of condensate. Heated for 30 minutes at 80° C. | No build-up on strip. Normal build up on remainder. | 305 |
| 10 | No further treatment (but no cleaning after Example 9) | Very fine skin on treated part. Heavy build-up on remainder. | 325 |
| 11 | No further treatment (but no cleaning after Example 10) | Fine skin on treated part. Very heavy build-up on remainder. | 350 |

The results shown in Table 2 indicate that the use of the condensate of p-hydroxybenzoic acid described in Example 6 produces a significant reduction in build-up without retarding the polymerisation reaction.

EXAMPLES 12–17

A series of vinyl chloride polymerisations was carried out to assess the effect of the condensate of formaldehyde and diamino diphenyl ether on build-up formation. The basic recipe used consisted of pretreating the autoclave wall as described in Table 3. Polymerisation was carried out using 100 parts of vinyl chloride (in aqueous suspension), 210 parts of water, a paddle stirrer rotating at 300 r.p.m., a polymerisation temperature of 50° C, 0.08 parts of diethylperoxydicarbonate as initiator and a suspension agent consisting of 0.2 parts of a partially hydrolysed polyvinyl acetate resin. The polymerisation of each batch was continued until the pressure in the reactor had fallen by 40 p.s.i. below the steady pressure during polymerisation. In Examples 13 and 14 the reactor walls were cleaned before treatment and polymerisation. In Examples 15, 16 and 17 however, the reactor walls were not pretreated as such but were used as obtained after discharging the batch corresponding to the previous example. The amount of build-up was estimated visually.

TABLE 3

| Example No. | Autoclave Pretreatment | Amount of build-up and reaction time |
|---|---|---|
| 12 | None | Skin over entire surface of reactor. |
| 13 | Reactor sprayed with a 3 % methyl ethyl ketone solution of diamino diphenyl ether. | Very very thin skin over reactor surface. Polymerisation retarded. |
| 14 | Reactor treated as in Example 13 and then with formaldehyde solution. Heated at 70° C for 30 minutes. | No build-up. Normal polymerisation time. |
| 15 | No further treatment (but no cleaning after Example 14) | No build-up. Normal polymerisation time. |
| 16 | No further treatment (but no cleaning after Example 15) | No build-up. Normal polymerisation time. |
| 17 | No further treatment (but no cleaning after Example 16) | Some small patches of build-up. Normal polymerisation time. |

The results shown in Table 3 indicate that the use of the condensate of formaldehyde and diamino diphenyl ether produces a significant reduction in build-up without retarding the polymerisation reaction.

We claim:

1. A process for the production of vinyl chloride polymers which comprises polymerizing vinyl chloride, or vinyl chloride and up to 20% by weight thereof of at least one ethylenically unsaturated monomer copolymerizable therewith, an aqueous dispersion, in a reactor having an inner wall(s) on which there has been directly deposited an insoluble layer of a cross-linked polymeric material containing polar groups and comprising a reaction product of formaldehyde and polyethylene imine.

2. A process according to claim 1 in which the polymerisation medium is maintained at a pH greater than 4.

3. A process according to claim 1 which is a batch polymerisation.

4. A process according to claim 1 in which the polymerisation is carried out in aqueous suspension.

5. A process according to claim 1 in which the layer of cross-linked polymer material is formed by applying a solution or dispersion of each component from which the material is formed separately or in admixture with one or more of the other components to the reactor wall and allowing the components to react on the wall.

6. A process according to claim 1 which is batch polymerisation and in which the amount of cross-linked polymeric material used is within the range of 1 to 2,000 parts per million, based on the weight of the vinyl chloride used in the polymerisation.

7. A process according to claim 1 in which the amount of cross-linked polymeric material used lies within the range 10 to 200 parts per million.

* * * * *